No. 777,369.

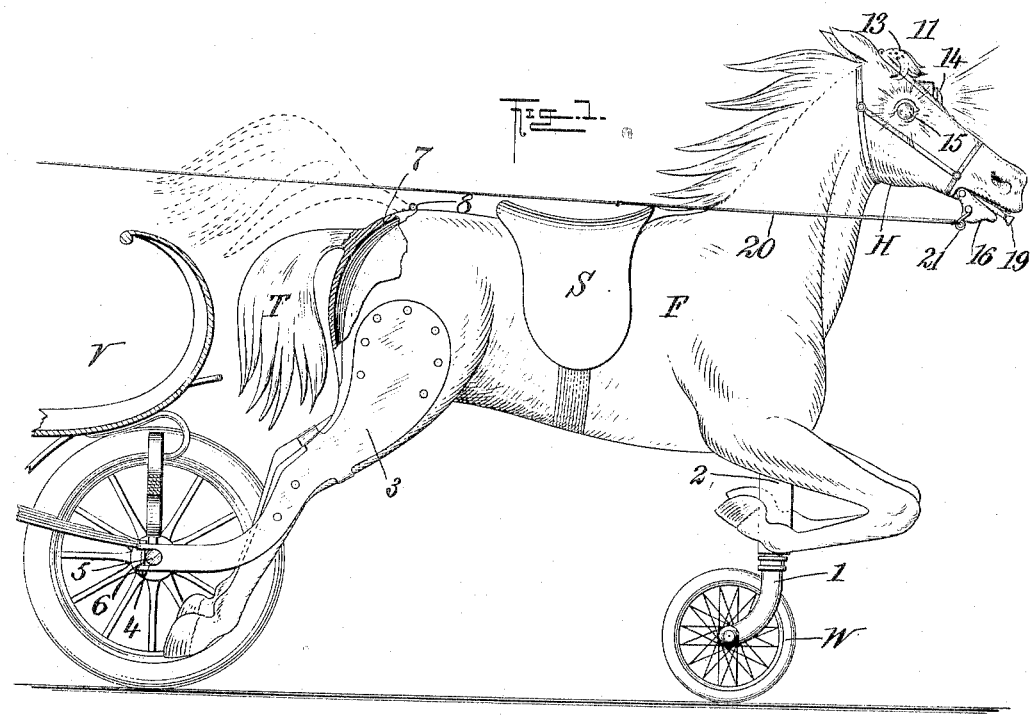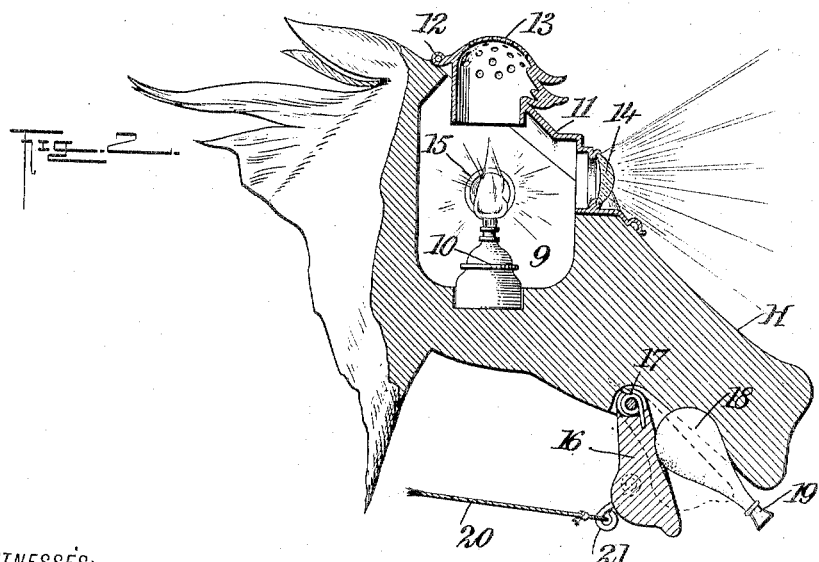

Patented December 13, 1904.

UNITED STATES PATENT OFFICE.

HENRY HAYES, OF DENVER, COLORADO.

MOTOR-VEHICLE ATTACHMENT.

SPECIFICATION forming part of Letters Patent No. 777,369, dated December 13, 1904.

Application filed May 16, 1904. Serial No. 208,160. (No model.)

*To all whom it may concern:*

Be it known that I, HENRY HAYES, a citizen of the United States, and a resident of Denver, in the county of Denver and State of Colorado, have invented a new and Improved Motor-Vehicle Attachment, of which the following is a full, clear, and exact description.

This invention relates to an attachment for motor-vehicles designed to prevent motor-vehicles from frightening the horses attached to horse-drawn vehicles upon the highways.

The object of the invention is to provide a figure of an animal, preferably a horse of approximately life-size, with means for attaching it to the front of a motor-vehicle in such manner that it may be propelled by the vehicle and present the appearance of a horse drawing the vehicle.

With the object above stated and others in mind, which will hereinafter appear, the invention consists in the novel construction, combination, and arrangement of parts of an attachment for motor-vehicles hereinafter fully described and having the novel features thereof particularly pointed out in the appended claims, it being understood that changes in the minor structural details may be made without departing from the spirit of the invention or sacrificing the advantages thereof.

Reference is to be had to the accompanying drawings, forming a part of this specification, in which similar characters of reference indicate corresponding parts in both views.

Figure 1 is an elevational view of the attachment shown in relation to the front of a motor-vehicle, which is shown partially in section; and Fig. 2 is a detail view in section through the head of the figure, which forms the essential part of the attachment.

Referring to the drawings, F designates the figure of an animal, preferably a horse, which is approximately life-size and may be constructed of any suitable material. The figure is supported in front upon a wheel W, preferably provided with a rubber or pneumatic tire and rotatably mounted in a swiveled fork 1, which turns in a downwardly-extending socket 2, placed between the fore legs of the figure. The hind quarters of the figure F have attached thereto a pair of plates 3, which correspond in a general way to the outlines of the hind legs of the figure, but are curved rearward at their lower ends and forked, as shown at 4, to receive the axle 5 at the front of a motor-vehicle, (indicated generally in Fig. 1 by the letter V.) The plates 3 may be attached to the axle of the motor-vehicle in any preferred manner, as by means of the transverse vertical bolts 6, which extend through the prongs of each fork 4 just behind the axle 5.

The body 5 of the figure is preferably made hollow, as indicated in Fig. 1, and the tail T of the figure is mounted upon a plate 7, which is hinged at 8, so that the plate may be lifted upward to expose the chamber formed within the body of the figure. The elevation of the tail of the figure is indicated in dotted lines in Fig. 1, and when the tail is so elevated free access to the chamber within the body of the figure may be had. The chamber serves as storage-space for fuel, tools, extra tires, and any other equipment with which it is desirable to provide an automobile or motor-vehicle.

In the head H of the figure I preferably form a chamber 9 to receive a lamp 10 of any preferred type, and above the chamber 9 a cover-plate 11 is hinged at 12. The cover-plate 11 comprises a perforated dome 13 for the escape of the products of combustion from the lamp 10, and near the lower margin the plate is provided with a lens 14, through which the rays from the lamp are directed upon the roadway. At either side of the head of the figure F there are preferably placed colored lenses 15, which correspond to the eyes of the animal.

The head H of the figure has hinged thereto a block 16, which represents the lower jaw of the animal, and a spring 17 is preferably provided by which the block is normally raised. Between the block 16 and the main portion of the head of the figure a bulb 18 is provided, and this bulb 18 has attached thereto a short flaring tube 19 or other device, through which air may be forced to produce a sound of sufficient intensity to serve as an alarm. A line 20, attached to an eye 21, secured in the block 16, extends rearward therefrom and enables the driver of the vehicle to draw the block 16 downward against the tension of the spring 17 to permit the bulb 18 to expand and fill with air. When tension upon the line 20 is relaxed, the spring 17 forces the block 16 against the bulb 18, and the air within the bulb is forced out through the tube 19, giving rise to a sound similar to that of the ordinary automobile-horn.

In the form of the invention illustrated the figure F is provided with a saddle S, which may serve as a seat for a rider, and if the saddle be so used the occupant thereof can operate the alarm by means of the line 20 and leave the driver of the vehicle free to devote his attention to the steering and control of the speed.

The action of the motor-vehicle attachment described in the foregoing paragraphs is so plainly evident from a mere inspection of the drawings that a detailed description thereof appears to be unnecessary. As the figure is pivotally attached at the rear to the front axle of the motor-vehicle so as to have pivotal movement in a vertical plane and is provided in front with a swiveled supporting-wheel, the figure will pass readily over the ordinary highways without interfering with the travel of the vehicle, and the slight additional weight of the figure will not impede the progress of the vehicle to any considerable extent.

Having thus described my invention, I claim as new and desire to secure by Letters Patent—

1. The combination with a motor-vehicle, of a figure attached to the front portion of the said vehicle and provided with a swiveled supporting-wheel in front.

2. The combination with a motor-vehicle, of a figure pivotally attached to the front portion of the vehicle, for movement in a vertical plane, said figure having a supporting-wheel beneath the forward portion thereof.

3. The combination with a motor-vehicle, of a wheel-supported figure pivotally attached to the front axle of the motor-vehicle, the axle serving as a pivot.

4. The combination with a motor-vehicle, of a wheel-supported figure having a pair of rearwardly-extending forked members adapted to receive the front axle of the vehicle, and means for securing said forked members in engagement with said front axle so as to permit pivotal movement of the figure in a vertical plane.

5. An attachment for motor-vehicles, comprising a figure or effigy of an animal, said figure being hollow to form a storage-chamber and having a hinged section to give access to the chamber, a swiveled supporting-wheel beneath the fore quarters of the animal, and rearwardly-extending supporting members attached to the hind quarters of the animal and adapted for attachment to a motor-vehicle.

6. An attachment for motor-vehicles, comprising an effigy or figure of an animal having the body formed hollow to provide a storage-chamber and having a hinged section to give access to the said chamber.

7. The combination with a motor-vehicle, of a figure of a horse having a hollow body to form a storage-chamber, said figure being pivoted to the front of the vehicle and having its fore quarters wheel-supported.

8. An attachment for motor-vehicles, comprising a figure of a horse, a swiveled supporting-wheel under the fore quarters of the horse, and plates secured to the hind quarters and extending rearwardly, the ends of the plates being forked to receive the front axle of the vehicle and the members of the forks apertured to receive fastening-bolts.

In testimony whereof I have signed my name to this specification in the presence of two subscribing witnesses.

HENRY HAYES.

Witnesses:
HARRY W. NEWCOMB,
J. H. WILKINS.